Figure 1:
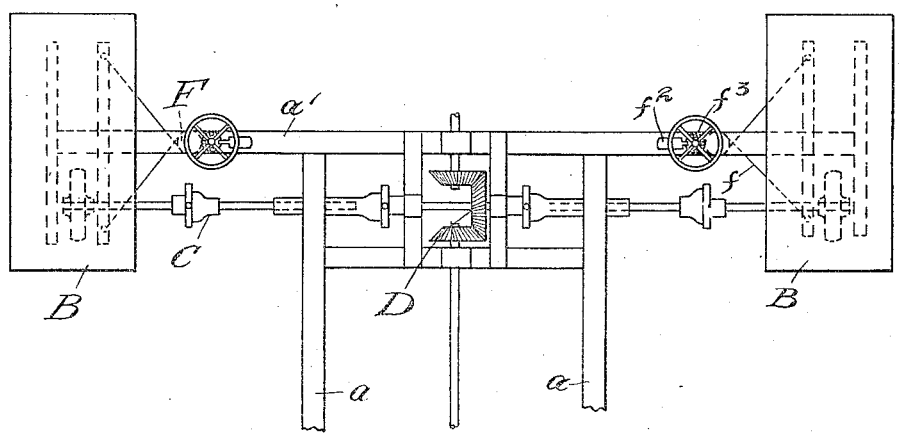

M. G. BUNNELL.
WHEEL SUPPORT.
APPLICATION FILED SEPT. 14, 1908.

1,037,428.

Patented Sept. 3, 1912.

3 SHEETS—SHEET 1.

WITNESSES
A. Andersen
C. C. Taylor

INVENTOR:
MORTON G. BUNNELL,
By Bulkley, Durand & Drury
ATTORNEYS

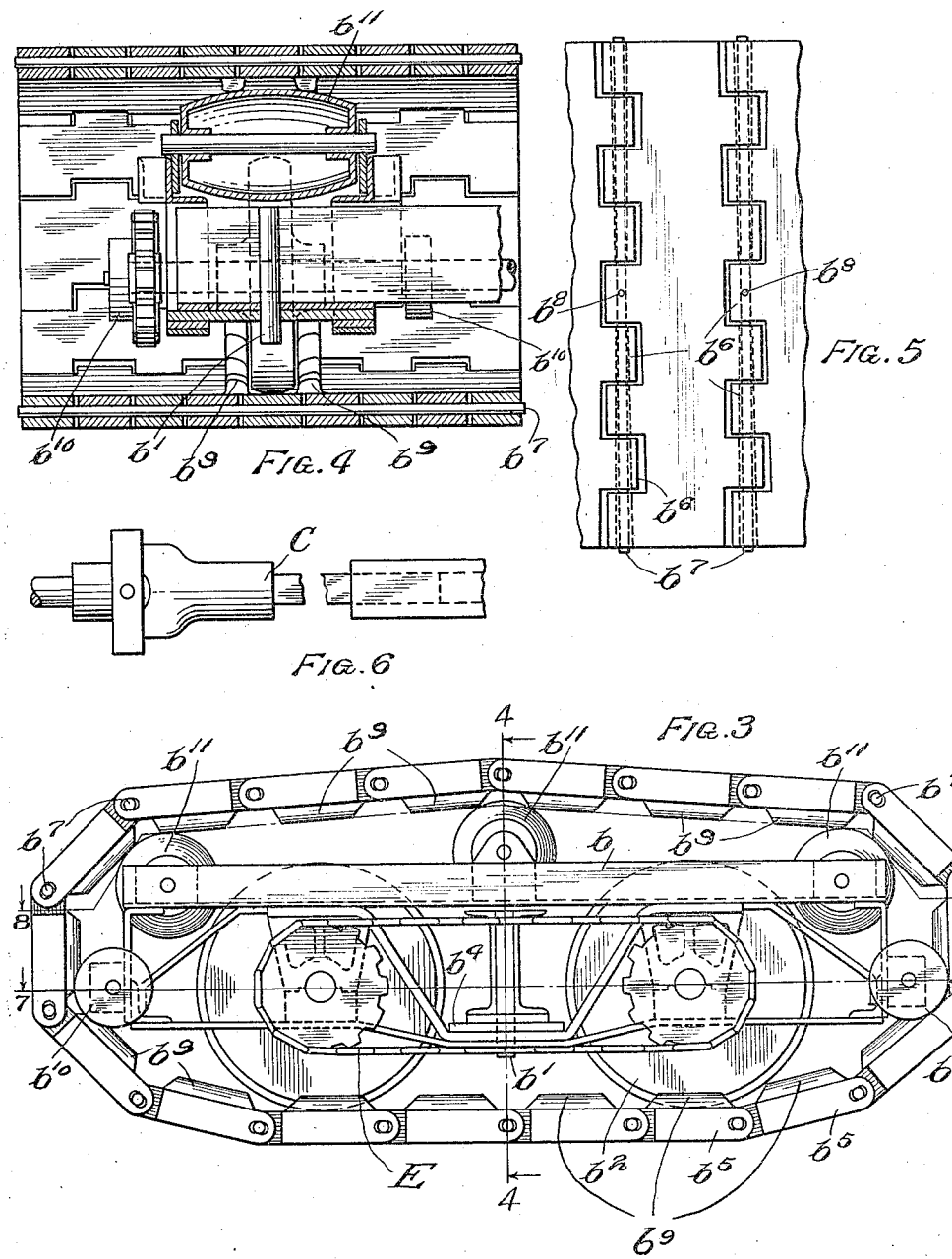

UNITED STATES PATENT OFFICE.

MORTON G. BUNNELL, OF CHICAGO, ILLINOIS, ASSIGNOR TO FREDERICK C. AUSTIN, OF CHICAGO, ILLINOIS.

WHEEL-SUPPORT.

1,037,428.  Specification of Letters Patent.  Patented Sept. 3, 1912.

Application filed September 14, 1908. Serial No. 453,074.

*To all whom it may concern:*

Be it known that I, MORTON G. BUNNELL, a citizen of the United States of America, and resident of Chicago, Cook county, Illinois, have invented a certain new and useful Improvement in Wheel-Supports, of which the following is a specification.

My invention relates to vehicles having traveling or self-laying tracks or ways upon which the wheels of the vehicle can roll and be supported against sinking into the ground. An arrangement of this kind is especially useful in connection with large and heavy vehicles, such as excavators, ditching machines and traction engines. The value of the track or support for this purpose is not only because of the great weight of machines of this kind, and the consequent necessity for a firm support on the ground, but also because of the danger of the machine becoming stalled in the mud or soft ground over which it may have to travel. Obviously, it is here that the traveling track or support, which is usually in the form of a broad and endless link belt, has its greatest usefulness, although it may also be used as an expedient for increasing the traction of a self-propelled vehicle on any and all kinds of ground. Various forms of these supports or tracks have been proposed, and some used, but none of which I regard as entirely successful and adapted for my purpose.

Generally stated, therefore, the object of my invention is to provide an improved and highly efficient traveling track or way for use in supporting the wheels of vehicles and movable bodies in general.

Special objects are to provide a traveling track or way of such character that it can, even with the truck wheels having relatively fixed axes, be flexed laterally to enable it to turn to the right or left, a thing heretofore impossible so far as I am now aware; to provide a vehicle or movable body having trucks that run within and rest upon traveling or self-laying tracks or ways for the wheels, and which can be turned or skewed like ordinary wheels or runners to make the machine travel to the right or left; to provide improved means for driving the wheels that roll on the endless traveling support or track; to provide an arrangement whereby more or less freedom of motion or flexibility will exist between the wheels and the tracks or ways on which they are supported, permitting the latter to conform readily to uneven ground; and to provide certain details and features of improvement tending to increase the general efficiency of an arrangement of this particular character.

To the foregoing and other useful ends, my invention consists in matters hereinafter set forth and claimed.

Figure 2:
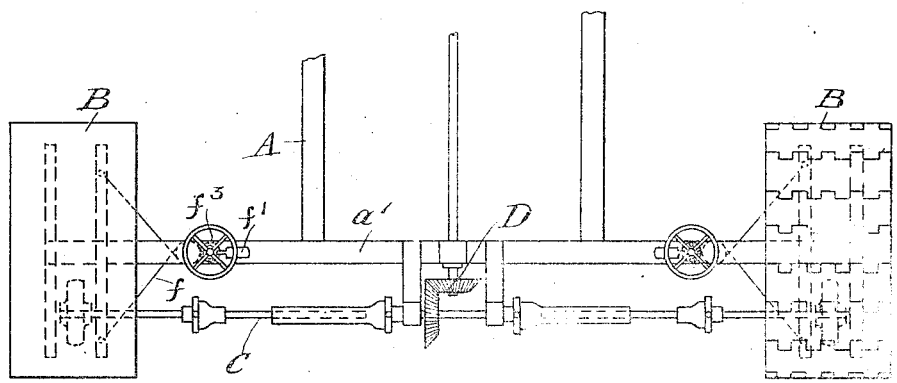
Figure 7:
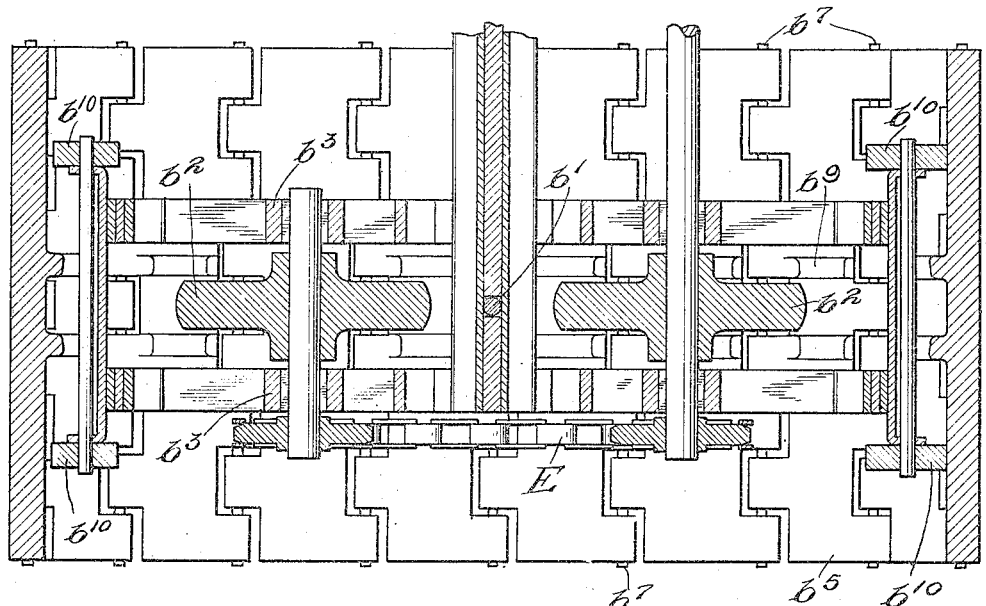
Figure 8:
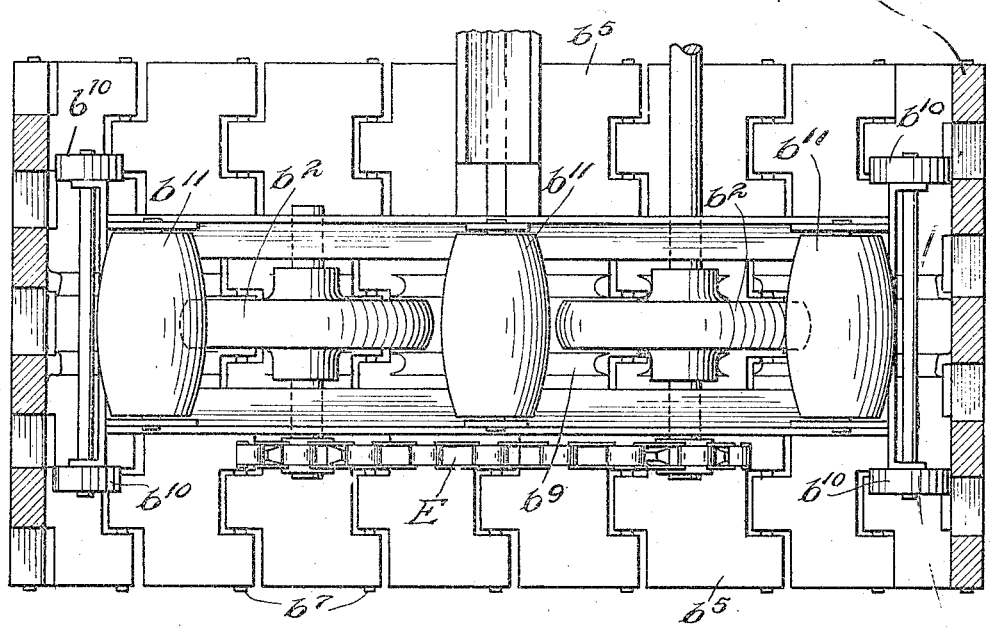

In the accompanying drawings:—Figure 1 is a plan view of a vehicle or movable body, having endless traveling tracks or ways for the wheels thereof, embodying the principles of my invention. Fig. 2 is an enlarged front elevation of one of the steering gears shown in Fig. 1. Fig. 3 is an enlarged side elevation of one of the trucks or wheeled members that have the endless traveling supports which move along on the ground to form tracks or ways for the wheels to rest upon. Fig. 4 is a transverse section on line 4—4 in Fig. 3. Fig. 5 is a detail view of a portion of the link belt or endless support shown in Fig. 3. Fig. 6 is an enlarged detail view of one of the tumbling rod connections for driving the wheels that support the vehicle and roll upon the said endless supports. Fig. 7 is a horizontal section on line 7—7 in Fig. 3. Fig. 8 is a similar section on line 8—8 in Fig. 3.

Thus illustrated, the body or frame A of the vehicle or machine may be of any suitable character. As shown, the same comprises longitudinal beams $a$ connected by transverse end beams $a'$, which latter serve as axles or bolsters for the trucks B by which the body or frame A is supported upon the ground. As the four trucks shown are all the same in character, a description of one will be sufficient.

Referring, therefore, to Figs. 3 to 8 inclusive, it will be seen that the truck therein shown comprises a rigid frame $b$ extending transversely of the end of the beam $a'$ and loosely secured thereto by a pivot or bolt $b'$, whereby the said frame $b$ is free to turn to the right or the left to steer the machine on its course, and free by reason of a slight looseness of the connection to rock so that one end of the truck will rise slightly when the other end falls. Wheels $b^2$ are mounted in bearings $b^3$ on said frame $b$, which latter, it will be understood, can be of any suitable construction. These wheels are preferably formed with rounded or convex treads, and are disposed one in front and one in rear of the beam $a'$, which latter is supported on a bearing plate $b^4$ carried by the lower portion of the frame $b$. Said wheels have their treads preferably grooved or roughened to prevent slipping, and travel upon a broad endless link belt composed of pivotally connected links $b^5$, which belt travels along the ground as fast as the wheels roll forward, the wheels and truck frame being disposed within the said belt. The links of the belt are hinged together by interlocking portions $b^6$, and by pintles or pivot rods $b^7$; and it will be seen that these rods are held by pins $b^8$ in the center or middle of each link, and that at each side of such center the said rods have considerable play or lost motion in the openings through which they extend in the portions $b^6$. The play or lost motion, however, is only in the plane of the links, and not other directions, as the holes are only enlarged in the one direction; and thus one link cannot rise or fall relative to the others. Moreover, the links are so formed that practically they have space between them at their outer ends only, or substantially so, there being no longitudinal play or lost motion at the center, whereby the links can move together or apart at the sides of the belt. In this way the said belt has a certain fixed circumference at the middle thereof, but the sides are adapted to expand or contract to increase or diminish the circumference of either side—that is to say, the links have slack or play in the plane thereof at the sides of the belt only. Obviously, therefore, the belt can flex to either side, so as to turn to the right or the left, depending upon which way the wheels are steered or cramped in directing the course of the machine. Upon the inner surfaces of the links, and at the center of the belt, two parallel rows of lugs $b^9$ are provided, thus in effect providing a groove or track in which run the wheels $b^2$, as shown in Fig. 4. Thus the broad belt or endless support must always follow the direction of travel of the wheels, and vice versa, the width of the belt or endless self-laying track thus provided being sufficient to support the wheels against sinking into soft ground. Wheels $b^{10}$, two at the front and two at the rear, are mounted on the ends of the frame $b$, and adapted to bear upon the inner surface of the link belt. When the machine is running straight ahead, the wheels $b^{10}$ at the front touch the belt, and the rear wheels $b^{10}$ are preferably out of contact therewith, thus giving the requisite slack in the belt necessary or desirable for changing the course of the machine. These wheels $b^{10}$ are set well apart, so that when the truck is turned or skewed one front wheel is pushed forward and the other drawn back, and one rear wheel is pushed rearward against the belt and the other moved forward, thereby bringing the two ends of the belt around in the direction of travel desired for the truck; and the wheels then roll forward and straighten out the belt, after which another turn can be given the truck and the operation repeated until the machine is finally brought into the desired position. The top of the belt is supported by barrel-shaped rolls $b^{11}$ mounted in bearings on the frame $b$ and adapted to contact with the lugs $b^9$ as the links $b^5$ travel along. With this arrangement the belt may careen to either side, while passing over uneven ground, the wheels remaining upright and in the groove provided by the lugs $b^9$; and when this takes place the upper portion of the link belt slides to one side or the other on the smooth surfaces of the rolls $b^{11}$. The fact that the links have slack or play at the sides of the belt is also responsible for the flexibility and surprising manner in which the belt readily conforms to uneven ground without interfering with its efficiency as a traveling ground support or track for the wheels of the truck.

Referring now again to Figs. 1 and 2, it will be seen that one wheel of each of the four trucks is driven by a tumbling rod connection C operated by gearing D driven in any suitable manner. By means of these tumbling rod connections the trucks are free to be turned or skewed without interfering with the transmission of power to the wheels thereof. Each front wheel is, it will be seen, connected by a sprocket chain E with the rear wheel, whereby the power is communicated to both wheels of each truck.

For steering the machine a drum F is mounted on the under side of the beam $a'$ adjacent each truck, and connected to the front and rear ends of the frame $b$ thereof by means of a cable or chain $f$, as shown. Each drum is geared to a vertical hand wheel shaft $f'$, the latter being held against rotation by a foot operated dog $f^2$ that engages a notched wheel $f^3$ on said shaft. By these steering gear arrangements the trucks can be turned or skewed to either side to give the machine the desired direction of travel.

The machine may have any suitable number of trucks, and may be used for any desired purpose, such as excavating, or it may be used as a traction engine. In any event, however, the traveling supports for the trucks serve effectually to prevent stalling of the wheels in the mud or soft ground over which the machine may find it necessary to travel, and when used on a self-propelled vehicle serves also to materially increase the tractive power thereof.

Preferably, in practice the connections and parts will be so formed that the truck frame may have a rocking motion relative to the beam or bolster $d'$—that is to say, the forward end of the truck may rise in passing over an obstruction, the two ends of the belt thus having an up and down motion relative to the vehicle or body of the machine, and this being accomplished by making the connection of the truck with the beam $d'$ sufficiently loose in character to insure the desired play or rocking motion of the truck while the same is passing over obstructions or uneven ground.

The wheels $a$ have relatively fixed axes, and, it will be seen, are arranged tandem in the endless belt. Even with this arrangement, though, as explained, the lateral flexibility of the belt, in conjunction with the means for skewing the wheels in the same direction, permits the traction device thus constructed to change its course readily and without straining the parts thereof.

What I claim as my invention is:—

1. In a vehicle or traveling body, an endless link belt for supporting the same on the ground, and means including tandem wheels having relatively fixed axes for deflecting said belt horizontally to either side, to change the direction of travel thereof, said belt adapted to careen over to either side, relative to said means.

2. In a vehicle or traveling body, an endless traveling supporting belt, wheels adapted to travel only at the center of said belt, and means for changing the direction of travel thereof, means for supporting the upper portion and permitting the said belt to careen over to either side, relative to said wheels.

3. In a vehicle or traveling body, an endless link belt for supporting the same on the ground, wheels adapted to travel only at the center of said belt, a truck frame for said wheels, and means within the belt for changing the direction of travel thereof, mounted on the ends of said truck, said belt adapted to careen over to either side, relative to said wheels.

4. In a vehicle or traveling body, an endless link belt for supporting the same on the ground, wheels adapted to travel only at the center of said belt, and said belt being free to careen over to either side while the wheels remain in vertical position.

5. In a wheeled vehicle or traveling body, an endless link belt for supporting the same on the ground, and means for deflecting said belt to either side to change the direction of travel thereof, said belt having the inner surface thereof provided with lugs forming a center groove or track for the wheels of the vehicle, whereby the narrow tread of each wheel rests and travels on the broad belt at a point between the said lugs, permitting the belt to tilt sidewise, said wheels having relatively fixed axes.

6. In a wheeled vehicle or traveling body, an endless traveling supporting belt for the wheels thereof, and means within the belt for changing the direction of travel thereof, said belt being flexible to conform to the surface of the ground, and having the inner surface thereof provided with lugs forming a groove or track for the wheels of the vehicle, whereby the tread of each wheel rests and travels on the belt at a point between the said lugs, and means for engaging the lugs above to prevent the upper portion of the belt from resting on the wheels, but permitting lateral displacement of the belt thereon.

7. In a wheeled vehicle or traveling body, an endless link belt for supporting the same on the ground, and means within the belt for changing the direction of travel thereof, said belt having the inner surface thereof provided with lugs forming a groove or track for the wheels of the vehicle, whereby the tread of each wheel rests and travels on the belt at a point between the said lugs, and a convex support on which the lugs of the upper portion of the belt rest and are free to slide to either side.

8. In a wheeled vehicle or traveling body, an endless link belt for supporting the same on the ground, said belt having the inner surface thereof provided with lugs forming a groove or track for the wheels of the vehicle, whereby the rounded tread of each wheel rests and travels on the belt at a point between the said lugs, permitting the belt to tilt sidewise, said wheels having relatively fixed axes.

9. In a vehicle or traveling body, an endless link belt for supporting the same on the ground, means for deflecting said belt to either side to change the direction of travel thereof, said belt being laterally flexible for this purpose, and barrel-shaped rolls for supporting the upper portion of said belt, permitting lateral sliding movement of the upper portion of said belt thereon.

10. In a vehicle or traveling body, an endless traveling supporting belt for the wheels thereof, a truck frame for said wheels, means for changing the direction of travel thereof, and barrel-shaped rolls for supporting the upper portion of said belt, mounted on said truck, permitting lateral movement of the upper portion of said belt thereon.

11. In a vehicle or traveling body, an endless link belt for supporting the same on the ground, means within the belt for changing the direction of travel thereof, and barrel-shaped rolls for supporting the upper portion of said belt, permitting lateral movement of the upper portion of said belt thereon, said rolls being arranged tandem at the center of the belt.

12. In a vehicle or traveling body, an endless link belt for supporting the same on the ground, and barrel-shaped rolls for supporting the upper portion of said belt, permitting lateral movement of the upper portion of said belt thereon.

13. In a vehicle or traveling body, an endless link belt for supporting the same on the ground, and means within the belt for changing the direction of travel thereof, including a vertical pivot within the belt connecting the latter with the vehicle, a plurality of tandem wheels movable about said pivot as a common axis, and wheels for skewing said means about said pivot.

14. In a vehicle or traveling body, an endless link belt for supporting the same on the ground, wheels traveling on the belt and having relatively fixed axes, and a vertical pivot within the belt, between said axes, connecting the latter with the vehicle.

15. In a vehicle or traveling body, an endless link belt for supporting the same on the ground, which belt is laterally flexible, means for deflecting said belt to either side to change the direction of travel thereof, and means including a tumbling rod and a supporting truck wheel operated thereby for driving said belt.

16. In a wheeled vehicle or traveling body, an endless traveling supporting belt for the wheels thereof, means for changing the direction of travel thereof, by skewing said wheels about a common vertical axis, and means including a tumbling rod and one of said wheels operated thereby for driving said belt.

17. In a vehicle or traveling body, an endless link belt for supporting the same on the ground, means within the belt for changing the direction of travel thereof, comprising a pivoted truck, and means including a tumbling rod for driving one of said wheels.

18. In a wheeled vehicle or traveling body, an endless link belt for supporting the same on the ground, means including a tumbling rod and a supporting truck wheel operated thereby for driving said belt, a body frame for supporting said driving means, and means for effecting the change in position of said wheel made possibly by said tumbling rod.

19. In a vehicle or traveling body, an endless traveling supporting belt for the supporting wheels thereof, means for changing the direction of travel thereof, wheels supported by and traveling within the belt, means on said belt for preventing lateral displacement of the wheels from the center of said belt, a truck frame for said wheels, and means on said truck for supporting the top of the belt out of contact with said wheels.

20. In a vehicle or traveling body, an endless link belt for supporting the same on the ground, means within the belt for changing the direction of travel thereof, by flexing the belt sidewise, wheels supported by and traveling within the belt, and means on said belt for preventing lateral displacement of the wheels from the center of said belt, said wheels having relatively fixed axes.

21. In a vehicle or traveling body, an endless link belt for supporting the same on the ground, said belt being adapted to stretch at each side but not at the center, means for deflecting said belt to either side to change the direction of travel thereof, comprising a truck mounted to turn about a pivot or vertical axis, and structural connections permitting the front and rear ends of the belt to rise and fall in passing over obstructions or uneven ground.

22. In a vehicle or traveling body, an endless traveling supporting belt for the wheels thereof, means for changing the direction of travel thereof, comprising a truck mounted to turn about a pivot or vertical axis, means on said truck for supporting the top of the belt, and structural connections permitting the front and rear ends of the truck to rise and fall about a horizontal axis in passing over obstructions or uneven ground.

23. In a vehicle or traveling body, an endless link belt for supporting the same on the ground, means within the belt for changing the direction of travel by lateral deflection thereof, comprising a truck mounted to turn about a pivot or vertical axis, means for driving one of the wheels of said truck, and structural connections permitting the front and rear ends of the belt to rise and fall in passing over obstructions or uneven ground.

24. In a vehicle or traveling body, an endless link belt for supporting the same on the ground, comprising a truck mounted to turn about a vertical axis, a pivot providing said axis, disposed within the belt, means within the belt for supporting said pivot, and structural connections permitting the front and rear ends of the belt to rise and fall in passing over obstructions or uneven ground, as set forth.

25. An endless traction belt, wheels running on the center of the belt, and means permitting the top of the belt to lean over to either side, without inclining the said wheels, and without longitudinally stretching the upper portion of the belt, while passing over uneven ground.

26. In a traction machine, a truck frame, a plurality of main supporting truck wheels arranged tandem and having axes which always remain parallel, and a laterally flexible supporting belt traveling around said frame and wheels.

27. In a traction machine, a truck frame, a plurality of main supporting truck wheels arranged tandem and having axes which always remain parallel, and a laterally flexible supporting belt traveling around said frame and wheels, and means for skewing the entire truck to change the course of said belt.

28. In a traction machine, a truck frame, a plurality of main supporting truck wheels arranged tandem and having axes which always remain parallel, a laterally flexible supporting belt traveling around said frame and wheels, and means for keeping the front and rear portions of said belt out of contact with said wheels.

29. In a traction machine, a truck frame, a plurality of main supporting truck wheels arranged tandem and having axes which always remain parallel, a laterally flexible supporting belt traveling around said frame and wheels, and means on the truck frame whereby said wheels contact with said belt only at the bottom thereof.

30. In a traction machine, a truck frame, a plurality of main supporting truck wheels arranged tandem and having axes which always remain parallel, a laterally flexible supporting belt traveling around said frame and wheels, means for keeping the front and rear portion of said belt out of contact with said wheels, and means for skewing the entire truck to change the course of said belt.

31. In a traction machine, a truck frame, a plurality of main supporting truck wheels arranged tandem and having axes which always remain parallel, a laterally flexible supporting belt traveling around said frame and wheels, means on the truck frame whereby said wheels contact with said belt only at the bottom thereof, and means for skewing the entire truck to change the course of said belt.

Signed by me at Chicago, Cook county, Illinois, this 29th day of August, 1908.

MORTON G. BUNNELL.

Witnesses:
C. E. TAYLOR,
J. NORBY.